G. P. WERN.
CORN BUTTERING DEVICE.
APPLICATION FILED SEPT. 25, 1916.

1,253,917.

Patented Jan. 15, 1918.

INVENTOR
Gustav P. Wern
BY
Lewis J. Doolittle
ATTORNEY

UNITED STATES PATENT OFFICE.

GUST. PERS. WERN, OF NEW YORK, N. Y.

CORN-BUTTERING DEVICE.

1,253,917.  Specification of Letters Patent.  Patented Jan. 15, 1918.

Application filed September 25, 1916. Serial No. 122,019.

*To all whom it may concern:*

Be it known that GUST. PERS. WERN, a citizen of the United States, residing in the city, county, and State of New York, U. S. A., has invented certain new and useful Improvements in Corn-Buttering Devices, of which the following is a specification.

This invention relates to a device designed to facilitate the application of butter to corn on the cob prior to eating and it has for an object the production of a device of this kind of simple construction and easy operation which will permit of a more satisfactory and desirable distribution of the butter upon the corn.

For further comprehension of the invention reference will be had to the following description and accompanying drawings, and to the appended claims in which the novel features of the invention are more particularly set forth.

Figure 1 of the drawings is a vertical sectional view of a butter distributer constructed according to the invention.

Figure 1:
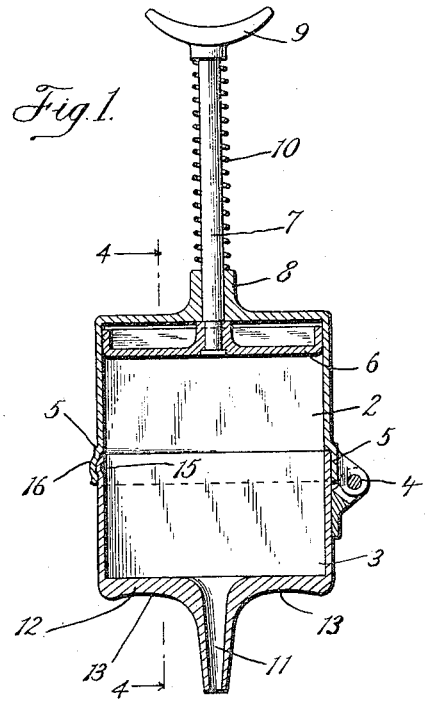

The device comprises a casing of rectangular or oblong cross section and which is here shown as divided into two parts or halves, 2 and 3 respectively, hinged to one another, as at 4, the part 2 having a projecting rim 5 overlapping the adjacent edge of the part 3. Contained within this casing is a rectangular plunger or piston 6 whose operating rod 7 is slidably mounted in a boss or head 8 on the part 2 and is provided on its outer end with a thumb piece 9. A spring 10, which encircles the rod and bears between the boss 8 and thumb piece 9, normally holds the plunger retracted within the casing.

Figure 2:
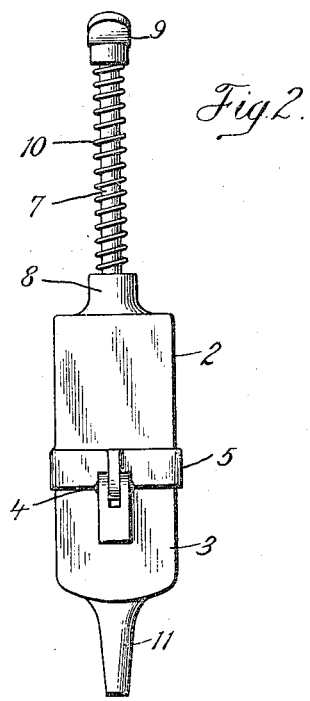
Fig. 2 is a side elevation thereof.
Figure 3:
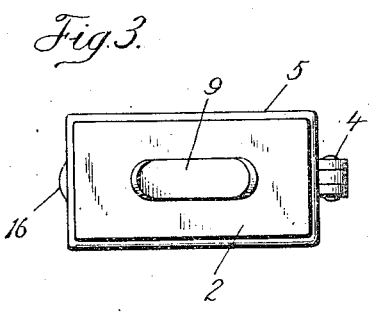
Fig. 3 is a top view thereof.
Figure 4:
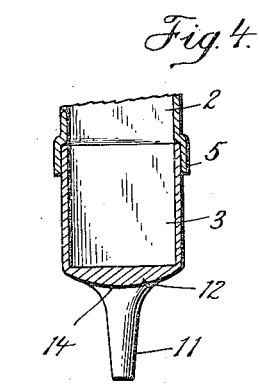
Fig. 4 is a detail vertical section taken on the line 4—4 of Fig. 1.

The end wall 12 of the part 3 of the casing is provided with an integral discharge nozzle 11 and the end wall on each side of said nozzle has a substantial portion thereof extending at right-angles to the side walls of the casing and its outer face is curved to form a grip for the fingers, preferably flaring away from the nozzle on opposite sides in concave curves 13, as shown in Fig. 2, such concaved portions being of convex curvature in transverse section, as shown at 14 in Fig. 4. The two parts of the casing may be held together when closed by any suitable means, that which I have here indicated comprising a projection 15 on the part 3 adapted to snap in a well known manner into a complementary part 16 on the rim 5 of the part 2.

In the operation of the device, the casing being first filled with butter and the two parts closed one upon the other, the device may be conveniently operated with one hand with the thumb placed over the thumb piece 9 and the fingers over the grip formed adjacent the nozzle 11, through which latter the butter may be forced as desired and be properly distributed between the rows of kernels.

As will be seen my invention permits of an easier and better distribution of the butter on the corn while the arrangement of parts enables the requisite pressure to overcome the resistance due to the viscous nature of the butter to be readily obtainable with one hand.

What I claim is:

1. The herein described corn buttering device comprising a casing of rectangular cross section and formed in two parts, a rectangular plunger in said casing, an operating rod therefor projecting through one end of said casing, a thumb piece on the outer end of said rod, a nozzle formed in the other end of said casing, the end wall of said casing on opposite sides of said nozzle having a substantial portion thereof extending approximately at right angles to the side walls of the casing and having its outer face curved to form a finger grip.

2. The herein described corn buttering device comprising a casing of oblong rectangular cross section and formed in two parts hinged together, a rectangular plunger in said casing, an operating rod therefor projecting through one end of said casing, a thumb piece on the outer end of said rod, a nozzle formed in the other end of said casing, the end wall of said casing on opposite sides of said nozzle being curved concavely in one direction and convexly in a direction at right angles to the first mentioned direction to form a finger grip.

Signed at the city, county, and State of New York, this 22nd day of September, 1916.

GUST. PERS. WERN.

Copies of this patent may be obtained for five cents each, by addressing the "Commissioner of Patents, Washington, D. C."